(12) United States Patent
Dias

(10) Patent No.: US 7,953,256 B2
(45) Date of Patent: May 31, 2011

(54) METHOD AND SYSTEM FOR DETECTING FINGERPRINT SPOOFING

(75) Inventor: Eric Wilfred Bruno Dias, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 11/859,326

(22) Filed: Sep. 21, 2007

(65) Prior Publication Data

US 2009/0080717 A1 Mar. 26, 2009

(51) Int. Cl.
*G06K 9/00* (2006.01)

(52) U.S. Cl. ........................................................ 382/124

(58) Field of Classification Search .................... 382/124
See application file for complete search history.

(56) References Cited

U.S. PATENT DOCUMENTS

| | | | | |
|---|---|---|---|---|
| 4,611,113 A * | 9/1986 | Halstead | ..................... | 235/78 R |
| 5,781,651 A * | 7/1998 | Hsiao et al. | ..................... | 382/127 |
| 5,982,914 A * | 11/1999 | Lee et al. | ..................... | 382/124 |
| 6,292,576 B1 * | 9/2001 | Brownlee | ..................... | 382/124 |
| 6,411,728 B1 * | 6/2002 | Lee et al. | ..................... | 382/125 |
| 6,591,002 B2 * | 7/2003 | Lee et al. | ..................... | 382/125 |
| 6,876,757 B2 * | 4/2005 | Yau et al. | ..................... | 382/125 |
| 6,907,035 B1 | 6/2005 | Byers et al. | | |
| 6,920,236 B2 * | 7/2005 | Prokoski | ..................... | 382/115 |
| 7,505,613 B2 * | 3/2009 | Russo | ..................... | 382/124 |
| 7,853,047 B2 * | 12/2010 | Hara | ..................... | 382/116 |
| 2002/0136435 A1 * | 9/2002 | Prokoski | ..................... | 382/118 |
| 2003/0002719 A1 * | 1/2003 | Hamid et al. | ................... | 382/124 |
| 2003/0035569 A1 * | 2/2003 | Chau | .................... | 382/124 |
| 2003/0039382 A1 * | 2/2003 | Yau et al. | ..................... | 382/125 |
| 2004/0252867 A1 * | 12/2004 | Lan et al. | ..................... | 382/124 |
| 2005/0063573 A1 * | 3/2005 | Setlak et al. | ................... | 382/124 |
| 2007/0003114 A1 * | 1/2007 | Hendriks et al. | .............. | 382/124 |
| 2007/0014443 A1 * | 1/2007 | Russo | ..................... | 382/124 |
| 2008/0166029 A1 * | 7/2008 | Presura | ..................... | 382/124 |
| 2009/0080717 A1 * | 3/2009 | Dias | ..................... | 382/124 |

FOREIGN PATENT DOCUMENTS

WO WO 2006/087656 * 8/2006

OTHER PUBLICATIONS

Jonathan D. Stosz and Lisa A. Alyea, "Automated system for fingerprint authentication using pores and ridge structure", Proc. SPIE 2277, 210 (1994), DOI:10.1117/12.191885.*

* cited by examiner

*Primary Examiner* — Sath V Perungavoor
(74) *Attorney, Agent, or Firm* — Yee & Associates, P.C.; Mark C. Vallone

(57) ABSTRACT

A system to detect fingerprint spoofing. In response to detecting a finger on a scanner plate, the finger is scanned to produce a scanned image of the finger. The scanned image of the finger is compared with a plurality of stored fingerprint images in a storage unit to validate an identity of a user. In response to determining that a match is found between the scanned image of the finger and one of the plurality of stored fingerprint images in the storage unit, a temperature around the scanner plate is regulated to activate sweat glands in the finger. The finger is rescanned after a predetermined period of time to produce a second scanned image of the finger. In response to determining that a sweat pattern is found in the second scanned image of the finger, access is authorized to a secure object and a message is displayed to the user.

13 Claims, 3 Drawing Sheets

METHOD AND SYSTEM FOR DETECTING FINGERPRINT SPOOFING

BACKGROUND OF THE INVENTION

1. Field of the Invention

The present invention relates generally to an improved fingerprint analysis system. More specifically, the present invention is directed to a method, system, and computer usable program code to detect biometric spoofing of fingerprints.

2. Description of the Related Art

Biometrics is the study of methods for uniquely recognizing humans based upon one or more physical characteristics or traits. There are numerous possible candidates for biometric data, each having its own strengths and weaknesses. Biometrics commonly include fingerprint, hand, face, retinal, voice, and signature scanning for validating an individual's identity.

Fingerprints are the oldest and most widely used biometric for identity verification. This is because fingerprints have strong fundamental qualities, such as nearly everyone has distinguishable fingerprints, except for those without fingers or those with certain skin diseases. Fingerprints are unique from person to person and from finger to finger, which offers up to ten unique fingerprints per person. Fingerprints are formed during embryonic development and after forming have a high degree of permanence over the course of an individual's life.

Fingerprints are easily captured using various non-invasive techniques, such as, for example, capacitive AC, capacitive DC, electro-optical, and optical scanning. Because of the high degree of uniqueness among fingerprints and the accuracy and ease with which fingerprints may be measured, fingerprints offer a good choice of biometric data for greater levels of security.

However, various attacks exist to gain unauthorized access to systems protected by biometric authentication. One such attack occurs at the scanning level, such as presenting an artificial biometric sample. For example, an artificial biometric sample for fingerprint scanning is a "gummy finger". A gummy finger is an artificial finger made, for example, from gelatin and may be used to spoof a biometric system. Studies indicate that a gummy finger may be created from a latent fingerprint of a person enrolled in the security system's database.

Currently, methods exist to make spoofing of a biometric system more difficult by determining whether or not a person is alive when the biometric data is presented to a system, but these current methods are difficult to automate in a fashion that is acceptable to users and feasible to implement. These current methods include temperature sensing, fingertip pulse detection, pulse oximetry, electrocardiography, dielectric response, and impedance. However, the extra equipment required to perform these tests, such as electrocardiography, may be very expensive and inconvenient for the user.

Therefore, it would be beneficial to have an improved method, system, and computer usable program code to detect biometric fingerprint spoofing by utilizing a scanning device capable of producing and detecting sweat in a live biometric sample.

SUMMARY OF THE INVENTION

Illustrative embodiments provide a method, system, and computer usable program code for detecting biometric fingerprint spoofing. In response to detecting a finger of a user on a scanner plate, the finger is scanned to produce a first scanned image of the finger. The first scanned image of the finger is compared with a plurality of stored fingerprint images in a storage unit to validate an identity of the user. Then, it is determined whether a match is found between the first scanned image of the finger and one of the plurality of stored fingerprint images in the storage unit. In response to determining that the match is found, temperature around the scanner plate is regulated to activate sweat glands in the finger. The finger is rescanned after a predetermined period of time to produce a second scanned image of the finger. Then, it is determined whether a sweat pattern is found in the second scanned image of the finger. In response to determining that the sweat pattern is found in the second scanned image of the finger, access is authorized to a secure object and a message is displayed to the user indicating that access is authorized.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
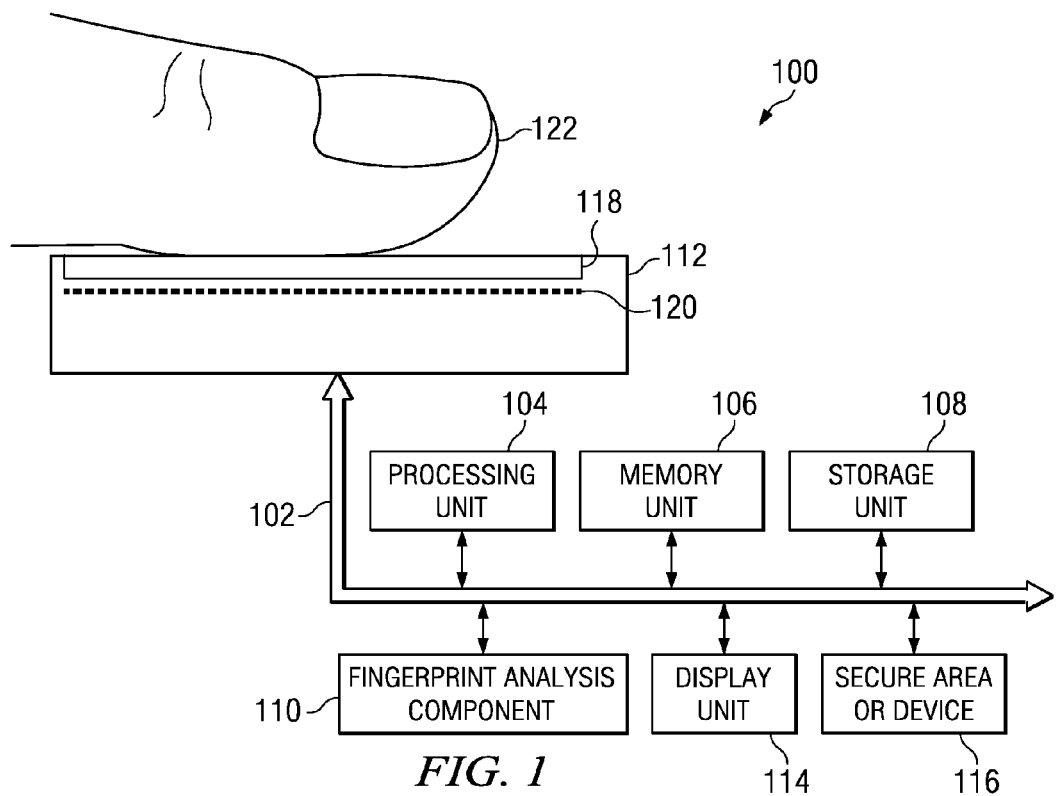
FIG. 1 is a pictorial representation of a fingerprint analysis security system in which illustrative embodiments may be implemented.

With reference now to the figures and in particular with reference to FIG. 1, an exemplary diagram of a data processing environment is provided in which illustrative embodiments may be implemented. It should be appreciated that FIG. 1 is only exemplary and is not intended to assert or imply any limitation with regard to the environments in which different embodiments may be implemented. Many modifications to the depicted environment may be made.

FIG. 1 shows a pictorial representation of a fingerprint analysis security system in which illustrative embodiments may be implemented. Fingerprint analysis security system 100 is an example of a data processing system in which code or instructions implementing processes of illustrative embodiments may be located. In addition, fingerprint analysis security system 100 is a security system that analyzes fingerprint biometric data to permit or deny access to one or more secure objects. The secure objects may, for example, be secure areas or devices.

In the depicted example, fingerprint analysis security system 100 employs a bus architecture, such as bus 102. Bus 102 may represent one or more buses. In addition, bus 102 may be implemented using any type of communication fabric or architecture that provides for a transfer of data between the different components and devices coupled to bus 102.

Fingerprint analysis security system 100 includes processing unit 104, memory unit 106, storage unit 108, fingerprint analysis component 110, fingerprint scanner 112, display unit 114, and secure area or device 116 which couple to bus 102. Processing unit 104 provides the data processing capabilities of fingerprint analysis security system 100. An operating system (OS) runs on processing unit 104. This OS coordinates and controls various components within fingerprint analysis security system 100. The OS may be a commercially available OS, such as, for example, Microsoft® Windows Vista™. Microsoft® and Windows Vista™ are trademarks of Microsoft Corporation in the United States, other countries, or both. An object oriented programming system, such as the Java™ programming system, may run in conjunction with the OS and provides calls to the OS from Java™ programs or applications executing on fingerprint analysis security system 100. Java™ and all Java-based trademarks are trademarks of Sun Microsystems, Inc. in the United States, other countries, or both. It should be appreciated by those of ordinary skill in the art that various other operating systems and programming systems may be used in fingerprint analysis security system 100 as well, and these fall within the scope of the present invention.

Storage unit 108 is a non-volatile data storage device that may, for example, be configured as ROM and/or flash ROM to provide the non-volatile memory for storing the OS, applications, and/or other data. In addition, storage unit 108 may represent a plurality of storage devices located locally and/or remotely. Storage unit 108 stores the instructions or computer usable program code for the OS and applications. The instructions are loaded into memory unit 106 for execution by processing unit 104. Processing unit 104 performs processes of illustrative embodiments by executing the computer usable program code that is loaded into memory unit 106. Additionally, the processes of the illustrative embodiments may be applied to a multiprocessor data processing system.

The other data stored in storage unit 108 may include security information, which fingerprint analysis security system 100 utilizes for validation or identification of individuals. The security information may include names, contact data, identification numbers, and security clearance levels for a plurality of individuals registered with fingerprint analysis security system 100. Further, the security information may include one or more stored fingerprint templates for each of the plurality of individuals registered with fingerprint analysis security system 100 for comparison with a currently scanned fingerprint image.

Fingerprint analysis security system 100 uses fingerprint analysis component 110 to compare a current fingerprint scanned image with the plurality of stored fingerprint templates within storage unit 108 to determine if a match is found. In addition, fingerprint analysis component 110 confirms the identity and liveness of an individual during the current fingerprint scan to either authorize or deny access to secure area or device 116, which fingerprint analysis security system 100 protects.

Fingerprint analysis security system 100 uses fingerprint scanner 112 to scan one or more fingers, such as finger 122. Fingerprint scanner 112 may, for example, be an optical, electro-optical, capacitive AC, or capacitive DC scanner. However, it should be noted that fingerprint scanner 112 may be any type of scanner capable of producing a fingerprint in accordance with an illustrative embodiment.

Fingerprint scanner 112 includes scanner plate 118 and temperature regulating device 120. Scanner plate 118 is a platform that permits scanning of one or more fingers in accordance with an illustrative embodiment. An individual needing identity verification, places finger 122 on scanner plate 118 for scanning.

Fingerprint analysis security system 100 uses temperature regulating device 120 to regulate the temperature in and/or around scanner plate 118 to activate the sweat glands in finger 122. Temperature regulating device 120 may, for example, include a heating element and an air blower. Temperature regulating device 120 may include any type of element capable of increasing the temperature in, or around, scanner plate 118. Also, the air blower may be used in addition to, or instead of, the heating element to regulate the temperature in, or around, scanner plate 118. The air blower may, for example, blow hot air on top, underneath, and/or around scanner plate 118 to regulate the temperature and/or the humidity. By raising the temperature sufficiently to activate sweat glands in finger 122, fingerprint analysis security system 100 prevents biometric fingerprint spoofing by using, for example, a finger from a cadaver or a gummy finger. In one illustrative embodiment, temperature regulating device 120 may be configured to rapidly heat and cool or blow a combination of hot air and cold air, thereby regulating the temperature around scanner plate 118, thereby regulating the humidity around scanner plate 118, which in turn results in activating the sweat glands. It should be appreciated by those of ordinary skill in the art that various other mean of regulating the temperature around scanner plate 118 may be employed advantageously and such means fall within the scope and the spirit of alternative illustrative embodiments.

Fingerprint analysis security system 100 uses display unit 114 to display messages to a user. Display unit 114 may, for example, be a liquid crystal display (LCD) unit. Display unit 114 may initially display a message, such as "Please place finger firmly on scanner." After fingerprint scanner 112 scans finger 122, display unit 114 may display other messages, such as, for example, "Hello, Dr. Smith, access granted" or "Access denied, invalid fingerprint" or "Please contact the security department prior to re-scan."

Fingerprint analysis security system 100 protects secure area or device 116 by restricting access only to authorized individuals. Authorized individuals are persons registered with fingerprint analysis security system 100 and have one or more fingerprint templates stored in storage unit 108. Secure area or device 116 may be any secure area, such as a research lab, or secure device, such as a computer containing highly confidential information, which requires restricted access for security purposes.

Illustrative embodiments provide a computer implemented method, system, and computer usable program code for detecting biometric fingerprint spoofing. In response to detecting a finger of a user on a scanner plate, a fingerprint analysis security system uses a fingerprint scanner to scan the finger to produce a scanned image of the finger. Then, the fingerprint analysis security system utilizes a fingerprint analysis component to compare the scanned image of the finger with a plurality of stored fingerprint images in a storage unit to validate an identity of the user.

The fingerprint analysis component then determines whether a match is found between the scanned image of the finger and one of the plurality of stored fingerprint images in the storage unit. In response to determining that a match is found, the fingerprint analysis security system uses a temperature regulating device to sufficiently regulate the temperature around the scanner plate causing the sweat glands in the finger to be activated. Afterward, the fingerprint analysis security system rescans the finger after a predetermined period of time, such as, for example, five seconds, to produce another scanned image of the finger. It should be noted that the process of rescanning may be repeated if required.

Then, the fingerprint analysis component determines whether a proper sweat pattern is found in the second scanned image of the finger to detect biometric fingerprint spoofing. In response to the fingerprint analysis component determining that a proper sweat pattern is found in the second scanned image of the finger, the fingerprint analysis security system authorizes access to a secure object, such as a secure area or a secure device. In addition, the fingerprint analysis security system uses a display unit to display a message to the user indicating that access is authorized. However, in response to the fingerprint analysis component determining that a proper sweat pattern is not found in the second scanned image of the finger, the fingerprint analysis security system denies access to the secure object and displays a message to the user indicating that access is denied.

Figure 2:
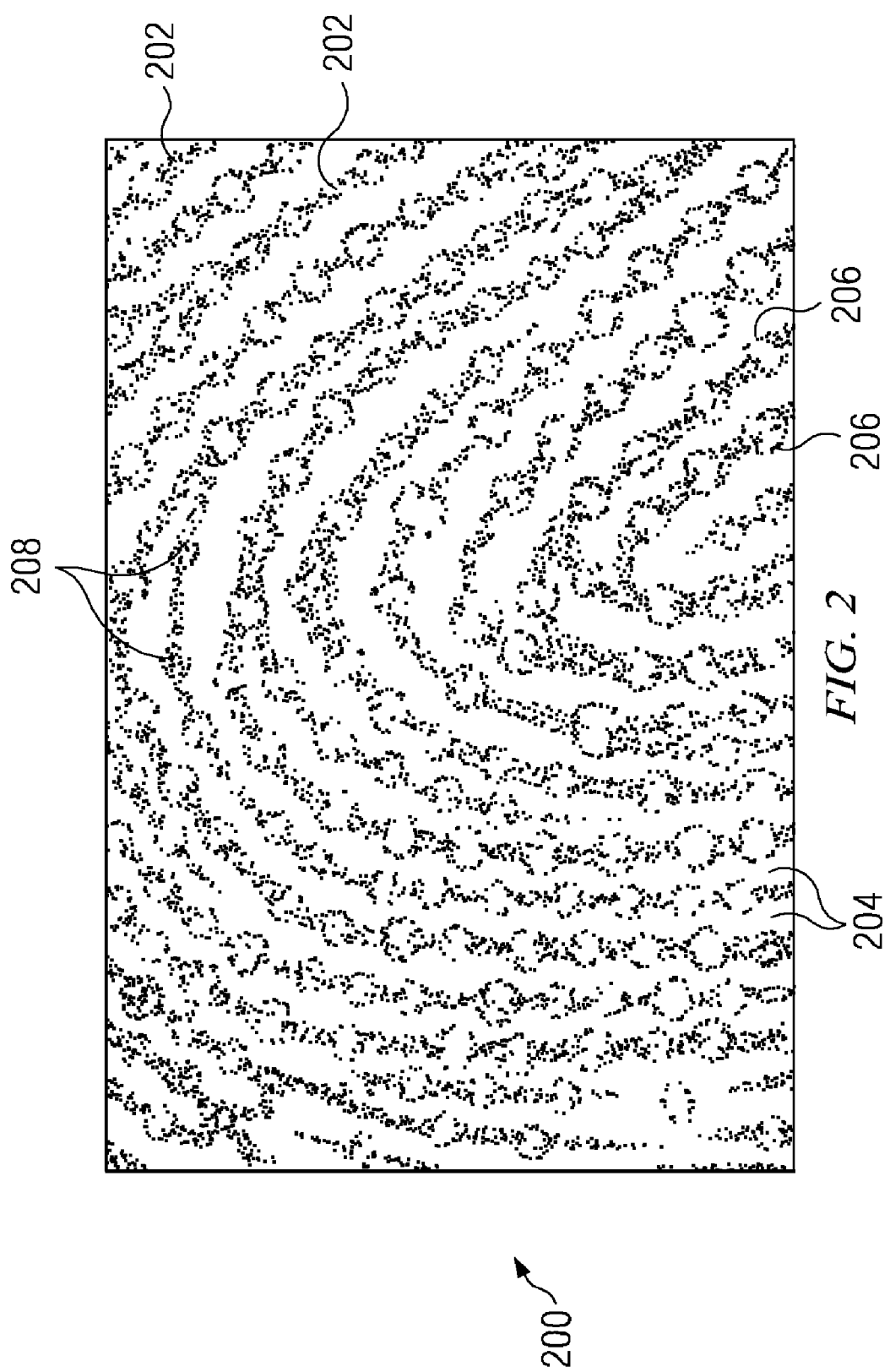
FIG. 2 is an exemplary illustration of a scanned fingerprint in accordance with an illustrative embodiment.

With reference now to FIG. 2, an exemplary illustration of a scanned fingerprint is depicted in accordance with an illustrative embodiment. Scanned fingerprint 200 represents a scanned fingerprint image from a finger, such as finger 122 in FIG. 1, produced by a scanner, such as fingerprint scanner 112 in FIG. 1. Scanned fingerprint 200 includes ridges 202, valleys 204, sweat pores 206, and minutiae 208.

Ridges 202 are shown as black lines and correspond to the ridges found in a fingerprint. Valleys 204 are shown as white lines and correspond to the valleys between the ridges found in a fingerprint. Sweat pores 206 are shown as white dots along ridges 202 and correspond to openings for sweat ducts, which convey sweat from sweat glands to the skin surface. Minutiae 208 are shown as black circles and correspond to other tiny details that may be found in a fingerprint.

Detection of live/active sweat glands in scanned fingerprint 200 may eliminate the possibility of biometric fingerprint spoofing using cadaver or gummy fingers. The method to determine whether a biometric sample presented for authentication is alive or not is based on three assumptions. First, for live fingers, perspiration starts from pores on the fingertips. This leaves a pore completely covered with perspiration, or as a dry spot surrounded by a sweaty area. Second, sweat diffuses along ridges over time. This means that the pore region remains saturated, while moisture spreads to drier parts. Third, perspiration does not occur in cadaver or gummy fingers. Thus, sweat detection improves liveness detection of the biometric sample presented for authentication.

By using a fingerprint scanner that acquires an image of the fingerprint with a very high resolution, it is possible to use minute details in the fingerprint, such as sweat pores 206 and minutiae 208, as liveness detection of the biometric sample. For example, there are approximately 600 sweat glands per square inch of skin and sweat, which is a dilute sodium chloride solution, diffuses from the sweat glands to the surface of the skin through small pores. Skin pores do not disappear, move, or spontaneously change over a person's lifetime. These minute details are difficult to copy in artificial biometric samples. For example, the pore-to-pore distance in the fingerprint is approximately 0.5 millimeters. In addition, sweat has a very high dielectric constant and electrical conductivity compared with lipid-soluble substances absorbed by the outmost layer of skin. Generally, the dielectric constant of sweat is approximately 30 times higher than the lipid-soluble substances.

Scanned fingerprint 200 shows a typical image of a fingerprint, on which sweat pores 206 are identified. As a result, small "pools" may be seen in which sweat inundates from time to time. However, sweat does not come forth at aleatory moments and if nothing is happening, the sweat does not come out. Consequently, producing sweat during a finger scan is not an easy task.

In one illustrative embodiment, hot air is blown over one or more surfaces of a scanner plate, such as scanner plate 118 in FIG. 1, to increase the temperature of the finger. As a result of the increased temperature of the finger, the pores sweat almost immediately. In another illustrative embodiment, the fingerprint scanner may be equipped with a temperature regulating device, such as a blower, which can rapidly blow bursts of hot air and cold air in quick intervals, thereby regulating the temperature around the scanner plate. As a result of the regulated temperature, a change in humidity around the fingerprint scanner plate will cause the pores to sweat. In yet a further illustrative embodiment, the fingerprint scanner may be equipped with a heating element to increase temperature to cause the pores to sweat. In a further illustrative embodiment, the fingerprint scanner may be equipped with both a heating element and an air blower to increase the temperature of the finger to produce sweat during scanning to detect liveness of the biometric sample. It should be appreciated by those of ordinary skill in the art that a combination of various heating and cooling devices and techniques may be used by alternative illustrative embodiments to regulate the temperature around the scanner plate, which activate the sweat glands in the finger.

Figure 3:
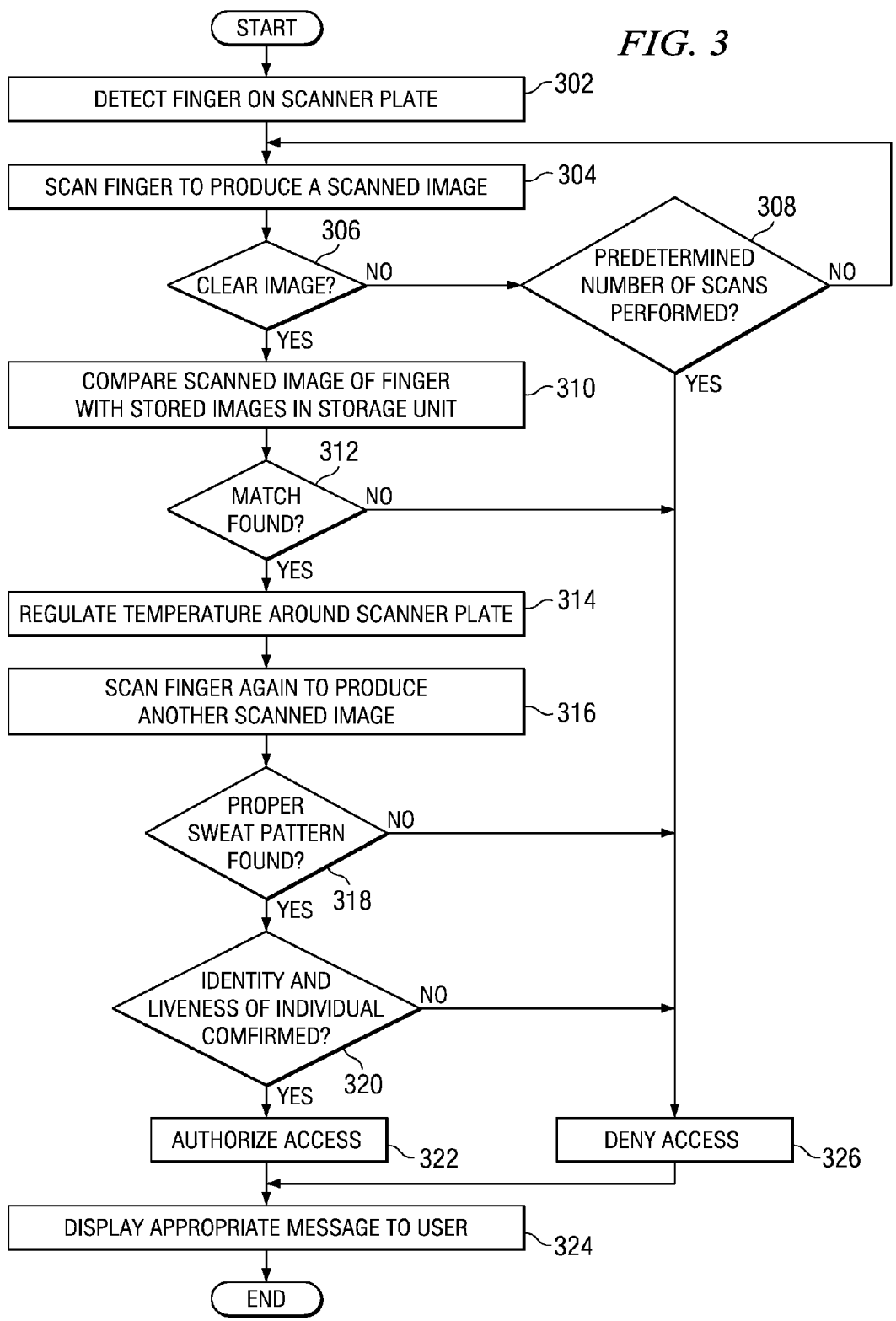
FIG. 3 is a flowchart illustrating an exemplary process for detecting biometric fingerprint spoofing in accordance with an illustrative embodiment.

With reference now to FIG. 3, a flowchart illustrating an exemplary process for detecting biometric fingerprint spoofing is shown in accordance with an illustrative embodiment. The process shown in FIG. 3 may be implemented in a fingerprint analysis security system, such as, for example, fingerprint analysis security system 100 in FIG. 1.

The process begins when the fingerprint analysis security system detects a finger on a scanner plate (step 302). For example, fingerprint analysis security system 100 detects finger 122 on scanner plate 118 in FIG. 1. Subsequent to detecting the finger on the scanner plate in step 302, the fingerprint analysis security system uses a scanner, such as fingerprint scanner 112 in FIG. 1, to scan the finger to produce a scanned image of the fingerprint, such as scanned fingerprint 200 in FIG. 2 (step 304).

Then, the fingerprint analysis security system utilizes a fingerprint analysis component, such as fingerprint analysis component 110 in FIG. 1, to make a determination as to whether the scanned image of the fingerprint is clear enough for proper analysis and comparison (step 306). If the scanned image is not clear, no output of step 306, then the fingerprint analysis security system makes a determination as to whether the scanner performed a predetermined number of scans on the finger (step 308). The predetermined number of scans may, for example, be three. If the predetermined number of scans has not been performed on the finger, no output of step 308, then the process returns to step 304 where the scanner scans the finger again to produce another scanned image. If the predetermined number of scans has been performed on the finger, yes output of step 308, then the process proceeds to step 326.

Returning now to step 306, if the scanned image is clear, yes output of step 306, then the fingerprint analysis component compares the scanned image of the finger with fingerprint images previously stored in a storage unit, such as storage unit 108 in FIG. 1 (step 310). After comparing the scanned image of the finger with the previously stored fingerprint images in step 310, the fingerprint analysis component makes a determination as to whether a match is found between the scanned image of the finger and one of the previously stored fingerprint images (step 312). If a match is not found, no output of step 312, then the process proceeds to step 326. If a match is found, yes output of step 312, then the fingerprint analysis security system utilizes a temperature regulating device, such as temperature regulating device 120 in FIG. 1, to regulate the temperature around the scanner plate in order to activate the sweat glands in the finger (step 314).

Subsequent to the temperature regulating device regulating the temperature around the scanner plate to produce sweat in step 314, the scanner scans the finger again to produce another scanned image of the finger (step 316). Then, the fingerprint analysis component makes a determination as to whether a proper sweat pattern is found in the second scanned image of the finger (step 318). If a proper sweat pattern is not found in the second scanned image of the finger, no output of the 318, then the process proceeds to step 326. If a proper sweat pattern is found in the second scanned image of the finger, yes output of the 318, then the fingerprint analysis component makes a determination as to whether the identity and liveness of an individual associated with the scanned finger is confirmed by finding a match and a proper sweat pattern (step 320).

If the identity and liveness of the individual is confirmed, yes output of step 320, then the fingerprint analysis security system authorizes access to a secure area or device, such as secure area or device 116 in FIG. 1 (step 322). Then, the fingerprint analysis security system uses a display unit, such as display unit 114 in FIG. 1, to display an appropriate message, such as access granted, to the user (step 324). The process terminates thereafter. Returning now to step 320, if the identity and liveness of the individual is not confirmed, no output of step 320, then the fingerprint analysis security system denies access to the secure area or device (step 326). Thereafter, the process returns to step 324 where the display unit displays an appropriate message, such as access denied, to the user.

Thus, illustrative embodiments provide a computer implemented method, system, and computer usable program code for detecting biometric fingerprint spoofing. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable storage medium providing program code for use by or in connection with a computer or any instruction execution system. For the purposes of this description, a computer-usable or computer-readable storage medium may be any tangible apparatus that may contain or store the program for use by or in connection with the instruction execution system, apparatus, or device.

The computer-readable storage medium may be an electronic, magnetic, optical, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Further, a computer-readable storage medium may contain or store a computer readable program code that is executed on a computer.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for detecting biometric fingerprint spoofing, the method comprising:

responsive to detecting a plurality of fingers of a user on a scanner plate of a scanner, scanning the plurality of fingers to produce a first scanned image of the plurality of fingers;

comparing the first scanned image of the plurality of fingers with a plurality of stored fingerprint images in a storage unit to validate an identity of the user;

determining whether a match is found between the first scanned image of the plurality of fingers and one of the plurality of stored fingerprint images in the storage unit;

responsive to determining that the match is found, regulating a temperature in the scanner plate to activate sweat glands in the plurality of fingers by increasing the temperature in the scanner plate using a heating element located in the scanner and regulating a temperature around the scanner plate to activate the sweat glands in the plurality of fingers by increasing the temperature around the scanner plate using an air blower associated with the scanner;

rescanning the plurality of fingers after a predetermined period of time to produce a second scanned image of the plurality of fingers;

determining whether a sweat pattern is found in the second scanned image of the plurality of fingers;

responsive to determining that the sweat pattern is found in the second scanned image of the plurality of fingers, authorizing access to a secure object; and displaying a message to the user indicating that access is authorized.

2. The method of claim 1, further comprising:

responsive to determining that the sweat pattern is not found in the second scanned image of the plurality of fingers, denying access to the secure object; and displaying a message to the user indicating that access is denied.

3. The method of claim 1, wherein the first scanned image of the plurality of fingers and the second scanned image of the plurality of fingers include sweat pores within the plurality of fingers.

4. The method of claim 1, wherein the second scanned image of the plurality of fingers is used to determine the liveness of the plurality of fingers.

5. The method of claim 1, wherein regulating the temperature around the scanner plate causes humidity around the scanner plate to be varied.

6. The method of claim 1, wherein the secure object is one of a secure area or a secure device.

7. A data processing system for detecting biometric fingerprint spoofing, comprising:
   a bus system;
   a storage unit connected to the bus system, wherein the storage unit includes a set of instructions; and
   a processing unit connected to the bus system, wherein the processing unit executes the set of instructions to scan a plurality of fingers of a user to produce a first scanned image of the plurality of fingers in response to detecting the plurality of fingers on a scanner plate of a scanner, compare the first scanned image of the plurality of fingers with a plurality of stored fingerprint images in the storage unit to validate an identity of the user, determine whether a match is found between the first scanned image of the plurality of fingers and one of the plurality of stored fingerprint images in the storage unit, regulate a temperature in the scanner plate to activate sweat glands in the plurality of fingers by increasing the temperature in the scanner plate using a heating element located in the scanner and regulating a temperature around the scanner plate to activate the sweat glands in the plurality of fingers by increasing the temperature around the scanner plate using an air blower associated with the scanner in response to determining that the match is found, rescan the plurality of fingers after a predetermined period of time to produce a second scanned image of the plurality of fingers, determine whether a sweat pattern is found in the second scanned image of the plurality of fingers, authorize access to a secure object in response to determining that the sweat pattern is found in the second scanned image of the plurality of fingers, and display a message to the user indicating that access is authorized.

8. A computer program product stored on a computer readable storage medium having computer usable program code encoded thereon that is executable by a computer for detecting biometric fingerprint spoofing, the computer program product comprising:
   computer usable program code configured to scan a plurality of fingers of a user to produce a first scanned image of the plurality of fingers in response to detecting the plurality of fingers on a scanner plate of a scanner;
   computer usable program code configured to compare the first scanned image of the plurality of fingers with a plurality of stored fingerprint images in the storage unit to validate an identity of the user;
   computer usable program code configured to determine whether a match is found between the first scanned image of the plurality of fingers and one of the plurality of stored fingerprint images in the storage unit;
   computer usable program code configured to regulate a temperature in the scanner plate to activate sweat glands in the plurality of fingers by increasing the temperature in the scanner plate using a heating element located in the scanner and regulating a temperature around the scanner plate to activate the sweat glands in the plurality of fingers by increasing the temperature around the scanner plate using an air blower associated with the scanner in response to determining that the match is found;
   computer usable program code configured to rescan the plurality of fingers after a predetermined period of time to produce a second scanned image of the plurality of fingers;
   computer usable program code configured to determine whether a sweat pattern is found in the second scanned image of the plurality of fingers;
   computer usable program code configured to authorize access to a secure object in response to determining that the sweat pattern is found in the second scanned image of the plurality of fingers; and
   computer usable program code configured to display a message to the user indicating that access is authorized.

9. The computer program product of claim 8, further comprising:
   responsive to determining that the sweat pattern is not found in the second scanned image of the plurality of fingers, denying access to the secure object; and
   displaying a message to the user indicating that access is denied.

10. The computer program product of claim 8, wherein the first scanned image of the plurality of fingers and the second scanned image of the plurality of fingers include sweat pores within the plurality of fingers.

11. The computer program product of claim 8, wherein the second scanned image of the plurality of fingers is used to determine the liveness of the plurality of fingers.

12. The computer program product of claim 8, wherein regulating the temperature around the scanner plate causes humidity around the scanner plate to be varied.

13. The computer program product of claim 8, wherein the secure object is one of a secure area or a secure device.

* * * * *